(12) United States Patent
Van Der Veen et al.

(10) Patent No.: US 8,754,587 B2
(45) Date of Patent: Jun. 17, 2014

(54) LOW COST POWER SUPPLY CIRCUIT AND METHOD

(75) Inventors: Geert Willem Van Der Veen, Eindhoven (NL); Jeroen Snelten, Liempde (NL)

(73) Assignee: Koninklijke Philips N.V., Eindhoven (NL)

( * ) Notice: Subject to any disclaimer, the term of this patent is extended or adjusted under 35 U.S.C. 154(b) by 119 days.

(21) Appl. No.: 13/381,980

(22) PCT Filed: Jun. 29, 2010

(86) PCT No.: PCT/IB2010/052953
§ 371 (c)(1),
(2), (4) Date: Jan. 3, 2012

(87) PCT Pub. No.: WO2011/001369
PCT Pub. Date: Jan. 6, 2011

(65) Prior Publication Data
US 2012/0112657 A1 May 10, 2012

(30) Foreign Application Priority Data
Jul. 3, 2009 (EP) .................................... 09164493

(51) Int. Cl.
*H05B 37/02* (2006.01)
*H02J 1/00* (2006.01)
*H02M 3/335* (2006.01)

(52) U.S. Cl.
USPC .......................... 315/291; 363/21.04; 307/11

(58) Field of Classification Search
None
See application file for complete search history.

(56) References Cited

U.S. PATENT DOCUMENTS

| 4,929,882 | A | | 5/1990 | Szepesi |
| 5,313,142 | A | * | 5/1994 | Wong ............................. 315/205 |
| 6,344,979 | B1 | * | 2/2002 | Huang et al. .................... 363/16 |
| 7,479,742 | B2 | * | 1/2009 | Matsui et al. .................. 315/291 |
| 2005/0225176 | A1 | | 10/2005 | Gan |
| 2009/0302777 | A1 | * | 12/2009 | Li et al. ......................... 315/287 |

FOREIGN PATENT DOCUMENTS

| WO | 0120758 A1 | 3/2001 |
| WO | 2008089541 A1 | 7/2008 |

OTHER PUBLICATIONS

"Hysteretic converters for multiple LED lighting", EE Times Asia, 2008, pp. 1-8, http://www.eetasia.com/ARTP_8800534547_480700.HTM.
Adragna et al., "A design methodology for LLC resonant converters based on inspection of resonant tank currents", 2004, pp. 1361-1367.
"An introduction to LLC resonant half-bridge converter", AN2644, 2008, pp. 1-64.

* cited by examiner

*Primary Examiner* — Crystal L Hammond

(57) ABSTRACT

A power supply circuit has an LLC converter stage for converting a DC voltage input into a DC voltage output, and at least one hysteretic converter stage. Each hysteretic converter stage has a DC voltage input coupled to the DC voltage output of the LLC converter stage, and a DC current output. The LLC converter stage lacks a feedback control, and is operated at its load independent point. A ripple on the DC voltage output of the LLC converter does not affect the output current of the hysteretic converter stage. The stable DC current output of the hysteretic converter stage is coupled to a load having one or more LED strings.

14 Claims, 3 Drawing Sheets

LOW COST POWER SUPPLY CIRCUIT AND METHOD

FIELD OF THE INVENTION

The invention relates to the field of power supply circuits and methods, and more specifically to supplying power in a lighting application to a load comprising a plurality of light emitting diodes, LEDs.

BACKGROUND OF THE INVENTION

In the field of power supplies, the use of an LLC converter is known. An LLC converter comprises a series arrangement of a first parallel arrangement of a first switch and a first diode, and a second parallel arrangement of a second switch and a second diode. The series arrangement is coupled between a first input terminal and a second input terminal for receiving a DC input voltage. A voltage on the first terminal is positive with respect to a voltage on the second terminal. The cathode of the first diode and the cathode of the second diode are directed to the first terminal. The first diode may be extrinsic, or may be intrinsic to the first switch. Likewise, the second diode may be extrinsic, or may be intrinsic to the second switch. A series arrangement of a capacitor, a first inductor, and a second inductor is coupled in parallel to either the first diode or the second diode. One of the first inductor and the second inductor may be a transformer. A rectifier and filter are coupled to either the first inductor or the second inductor for supplying a filtered DC output voltage. A control circuit comprises a switching control means for controlling the frequency of an on and off switching of the first switch and the second switch.

The topology of the LLC converter has a number of advantages, such as a low Electromagnetic Interference, EMI, and a high efficiency. The output voltage of the LLC converter normally is controlled by feedback control of the switching frequency of the switches. The LLC converter may be driven above the resonance frequency in order to avoid hard switching. In this so-called soft switching mode, the current through the switched-off first switch is positive just before the moment of switching-off. As a result, the voltage on the connecting node between the first and second switches commutates, and the second diode parallel to the second switch commutates, and the second diode parallel to the second switch starts conducting current. The second switch may be switched on at the moment the second diode is conducting, so virtually no switching losses occur. At such operating conditions, the use of MOSFETs, Metal Oxide Semiconductor Field Effect Transistors, as switches comprising intrinsic diodes is most suitable.

For a stable control behavior close to the resonance frequency of the LLC converter, the control circuit would have to be adapted for every change of operating conditions. However, for most applications this is not a feasible solution. On the other hand, frequency control can be used when the operating frequency is not close to the resonance frequency. However, in this situation the needed frequency sweep would be large in order to cover all input and output voltage variations. Thus, when using a LLC converter, normally extensive (and therefore expensive) control circuitry is necessary to obtain the desired performance, for example when the LLC converter would be used in a power supply circuit for driving an LED lighting module containing a plurality of LEDs, such as one or more strings of LEDs, in one or more color channels.

SUMMARY OF THE INVENTION

It would be desirable to provide a power supply circuit having a good performance at low cost.

To better address one or more of these concerns, in a first aspect of the invention a power supply circuit is provided that is configured to supply a stable DC current output. In an embodiment, the power supply circuit comprises an LLC converter stage for converting a DC voltage input into a DC voltage output, and at least one hysteretic converter stage having a DC voltage input coupled to the DC voltage output of the LLC converter stage, and having a DC current output. The LLC converter stage lacks a feedback control.

In an embodiment of the invention, the LLC converter stage is configured to operate at a predetermined frequency. More in particular, the LLC converter stage is configured to operate at a load independent point thereof, having a voltage gain equal to one.

In a further aspect of the invention, a lighting arrangement is provided, which comprises the power supply circuit of the invention. Each DC current output of the power supply circuit may be coupled to a LED lighting module.

In a still further aspect of the invention, a method of supplying a stable DC current to at least one load is provided. The method comprises: converting a DC voltage input into a DC voltage output by an LLC converter stage operated at a predetermined frequency; converting the DC voltage output of the LLC converter stage into at least one DC current output by a corresponding hysteretic converter stage; and supplying the at least one DC current output to the at least one load.

The LLC converter stage is operated at a load independent point, and does not need any elaborate control circuit. Each hysteretic converter stage produces a stable output current independent of the input voltage, so a voltage variation on the DC voltage output of the uncontrolled LLC converter stage will not have any effect on the hysteretic converter stage current output.

In other words, the present invention proposes to use an uncontrolled voltage source without any feedback means (the LLC converter stage) for providing a steady state output voltage, in combination with one or more load current drivers that are not affected by the ripple and tolerance on the output voltage of the LLC converter stage. This will result in a low cost system with good performance, further providing a high efficiency and good electromagnetic compatibility, EMC, behavior.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

Figure 1:
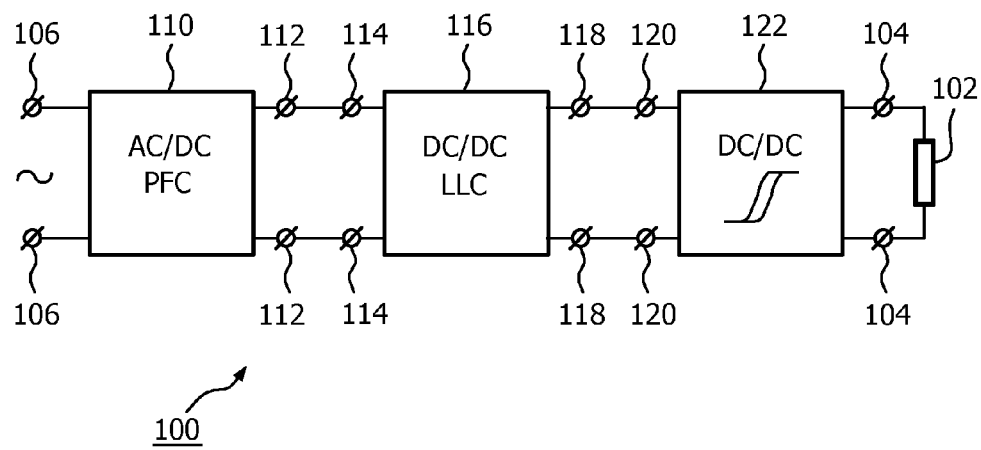
FIG. 1 depicts a block diagram of an embodiment of a power supply circuit of the present invention, connected to a load.

FIG. 1 depicts a schematic diagram of an embodiment of a power supply circuit 100, connected to a load 102 through output terminals 104. The power supply circuit 100 comprises a first converter stage 110 for converting an AC mains input voltage supplied at input terminals 106 into a DC output voltage (e.g. 430 V) at terminals 112. The first converter stage 110 may be a boost converter, and comprises a rectifier circuit and power factor correction, PFC, circuitry as known per se to the skilled person in various embodiments. If a DC (mains or bus) voltage would be available instead of, or in addition to the AC mains voltage, the first converter stage 110 may be omitted.

Figure 2:
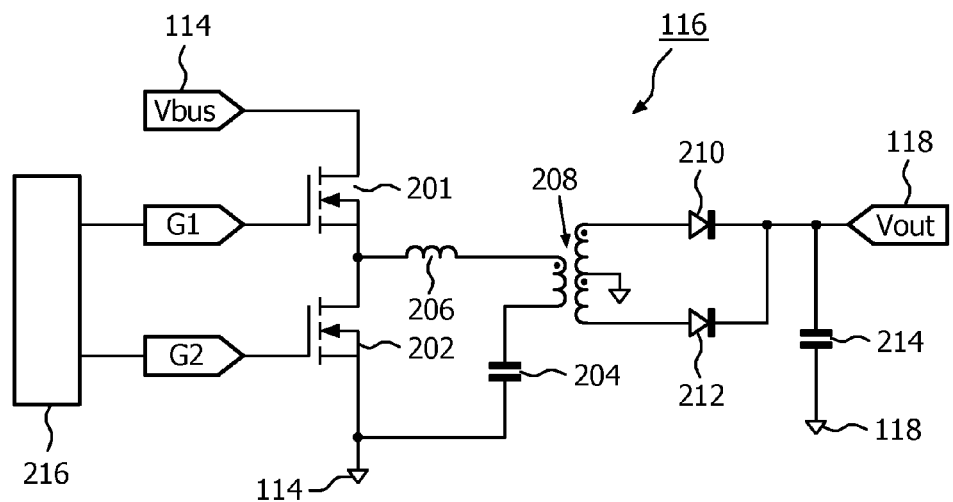
FIG. 2 depicts a circuit diagram of an embodiment of an LLC converter stage for a power supply circuit of the present invention.

The DC output voltage of the first converter stage 110 (or a DC mains or bus voltage) is supplied to DC input voltage terminals 114 of a second converter stage, which is also referred to as LLC converter stage 116. The LLC converter stage 116 outputs a DC voltage at output terminals 118. A circuit diagram of an embodiment of the LLC converter stage 116 is shown in FIG. 2, and discussed in detail below.

Figure 4:
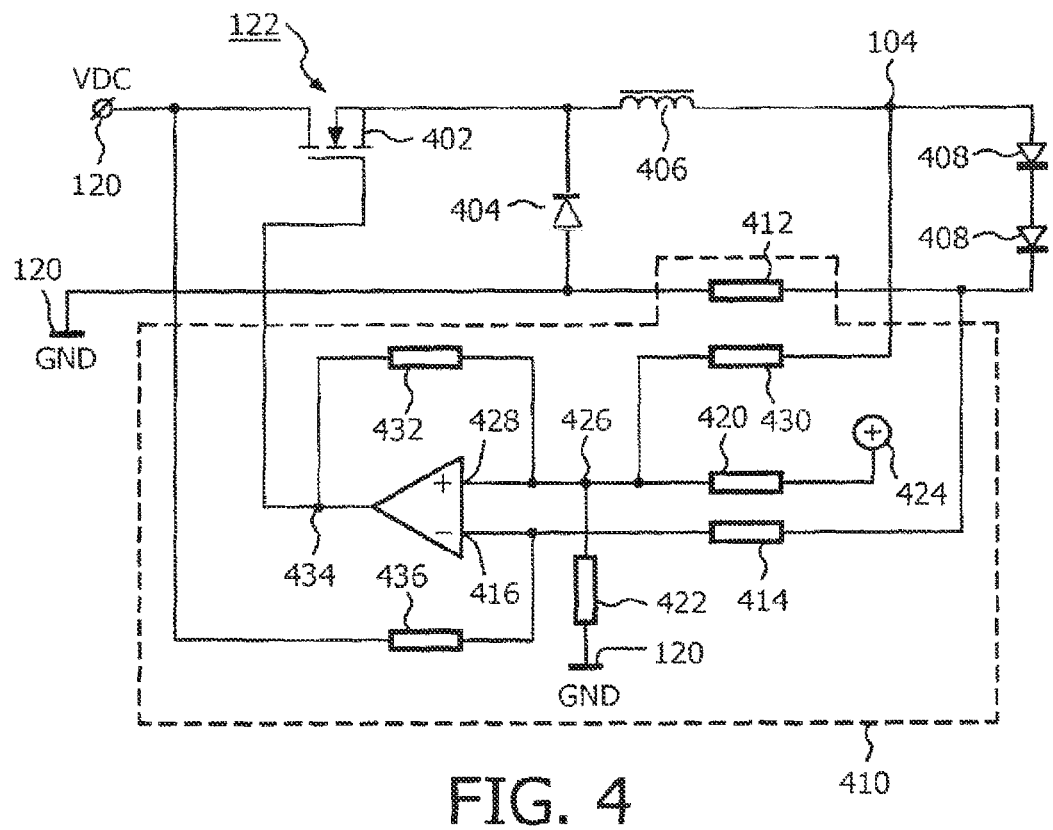
FIG. 4 depicts a circuit diagram of an embodiment of a hysteretic converter stage for a power supply circuit of the present invention.

The DC output voltage of the second converter stage 116 is supplied to DC input voltage terminals 120 of a third converter stage, which is also referred to as hysteretic converter stage 122. The hysteretic converter stage 122 outputs a DC current at the output terminals 104. A circuit diagram of an embodiment of the hysteretic converter stage 122 is shown in FIG. 4, and discussed in detail below.

The load 102 may comprise a plurality of LEDs, such as a one or more strings of LEDs.

The power supply circuit 100 may comprise a plurality of hysteretic converter stages 122 coupled in parallel to the LLC converter stage 116, each hysteretic converter stage 122 having its own load. Thus, each hysteretic converter stage 122 e.g. may be one of a red, green, blue (RGB) color channel, or may be one of a red, green, blue or white (RGBW) color channel in a LED lighting application.

By using an LLC converter stage 116 in the power supply circuit 100, an isolated supply current may be output, while also a high DC output voltage of the first converter stage 110 may be matched with a low load voltage through a winding ratio of a transformer of the LLC converter stage 116.

FIG. 2 shows an LLC converter stage 116 comprising a series arrangement of a first switch 201 and a second switch 202. The switches 201, 202 are depicted as MOSFETs, but they may also be embodied as another type of semiconductor switch. The MOSFETs comprise an intrinsic diode which may, however, be supplemented with an external diode. Also in case of another type of semiconductor switch, an external diode may be provided, as this function is mandatory in the LLC converter stage 116. The series arrangement of the first switch 201 and the second switch 202 is coupled between the input terminals 114, marked Vbus and as a mass connection in FIG. 2, for receiving a DC input voltage from the first converter stage 110. A voltage on the terminal 114 marked Vbus is positive with respect to a voltage on the other terminal 114. A cathode of the diode intrinsic or extrinsic to the first switch 201, and a cathode of the diode intrinsic or extrinsic to the second switch 202 are directed to the terminal 114 marked Vbus. A series arrangement of a capacitor 204, a first inductor 206, and a second inductor 208 is coupled in parallel to the first switch 201, although this series arrangement could alternatively be coupled in parallel to the second switch 202. The second inductor 208 is a transformer having a primary winding coupled between the capacitor 204 and the first inductor 206, and having a center-tapped secondary winding. The first inductor 206 may also be an intrinsic part of the second inductor 208, and may represent a leakage inductance of the second inductor 208 (transformer). This implies that in such a situation there is only one magnetic component in the LLC converter stage 116 in practice. On the other hand, in some applications no isolation (as provided by the transformer) is necessary, and an inductor may replace the transformer.

A rectifier circuit comprising a parallel arrangement of diode 210 and diode 212 coupled in parallel with a filter capacitor 214 are coupled to the second inductor 208 for supplying an isolated filtered DC output voltage at output terminals 118, marked Vout and as a mass connection in FIG. 2. A control circuit 216 coupled to control terminals G1 and G2 comprises a switching control means not shown in further detail for controlling the frequency of an on and off switching of the first switch 201 and the second switch, respectively.

The control circuit 216 does not comprise any feedback control means, and uses a preset timing device to provide a fixed switching frequency of the first switch 201 and the second switch 202. A selection of the switching frequency is elucidated by reference to FIG. 3.

Figure 3:
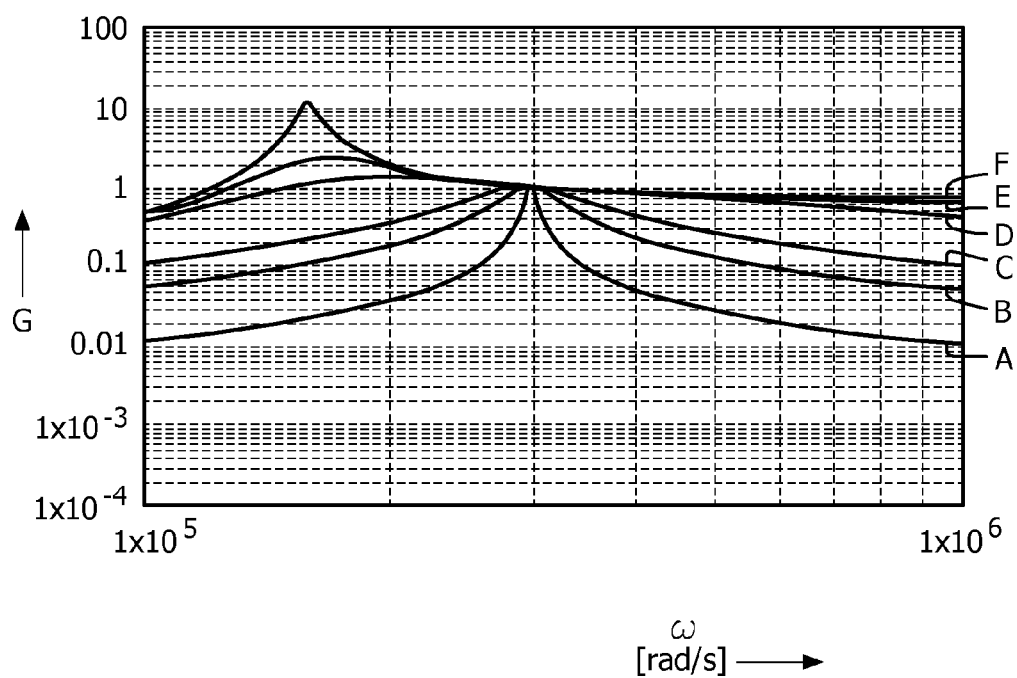
FIG. 3 depicts a diagram of an LLC converter stage gain across a frequency range for different loads of the LLC converter stage of FIG. 2.

FIG. 3 shows by way of example a diagram of the LLC converter stage gain (voltage gain G) for different load conditions, where the load condition represented by a line A is a high load (high current, low impedance), and the load conditions represented by lines B, C, D, E, and F are subsequently decreasing loads (less than high current, more than low impedance), where the load condition represented by line F is a low load (low current, high impedance). For example, the ratio of inductances of the second inductor 208 and the first inductor 206 is equal to 4. In the frequency range depicted in FIG. 3 (100 krad/s-1 Mrad/s), a load independent point may be recognized near 300 krad/s. This is the frequency at which the LLC converter stage 116 operates at its load independent point. With idealized circuit components, at this resonance frequency the output voltage will always have the same value, independent of the load value, in other words: the voltage gain G=1. In a practical circuit, a small load dependence of the output voltage will occur, e.g. due to a series resistance of the inductive components and forward voltage of diodes. When the DC voltage supplied by the first converter stage 110 to the LLC converter stage 116 is stable and controlled, the output voltage of the LLC converter stage, which depends on the input DC voltage variation proportionally, will also be stable. This operating condition is ensured when the first converter stage 110 e.g. is a boost converter PFC circuit.

FIG. 4 shows a hysteretic converter stage 122, in the embodiment shown a hysteretic down converter stage, comprising a series arrangement of a third switch 402 and a diode 404. The cathode of the diode 404 is directed to the switch 402. The switch 402 is depicted as a MOSFET, but may also be embodied as another type of semiconductor switch. The series arrangement of the switch 402 and the diode 404 is coupled between the DC input voltage terminals 120, marked VDC and as a ground, GND, terminal, for receiving a DC input voltage from the LLC converter stage 116. A third inductor 406 has one terminal coupled to the cathode of the diode 404, and an opposite terminal being one of the DC current output terminals 104. A load comprising a plurality of light emitting diodes, LEDs, 408, or one or more LED strings, may be coupled between the output terminals 104. In the embodiment shown, the hysteretic converter stage is a buck converter type. However, the present invention may also be applied to boost converter types or buck-boost converter types of a hysteretic converter stage.

The hysteretic converter stage 122 comprises a control circuit 410 which is indicated with a dashed line in FIG. 4. For clarity, some components which are unnecessary for an understanding of the present invention by the skilled person, such as components providing a gate drive, protection and enable logic, have been omitted.

A resistor 412 is coupled between one of the output terminals 104 and the anode of the diode 404. A resistor 414 is coupled between said one of the output terminals 104 and a first input 416 of a comparator 418. A series arrangement of resistors 420 and 422 is coupled between a reference voltage terminal 424 (e.g. 5 V) and a ground, GND, terminal 120. A node 426 coupled between resistor 420 and resistor 422 is coupled to a second input 428 of the comparator 418. A resistor 430 is coupled between the node 426 and one of the DC current output terminals 104 coupled to the third inductor 406. A resistor 432 is coupled between the second input 428 of the comparator 418 and an output 434 of the comparator 418. The output 434 is coupled to a control terminal (gate) of the third switch 402. A resistor 436 is coupled between the first input 416 of the comparator 418 and one of the DC input voltage terminals 120 coupled to the third switch 402.

A hysteretic converter stage output current is measured with resistor 412 providing, through resistor 414, a voltage at the first input 416 of the comparator 418. Resistors 420 and 422 set a reference voltage level of the comparator 418. Resistor 432 produces a hysteresis on this reference voltage level.

Figure 5:
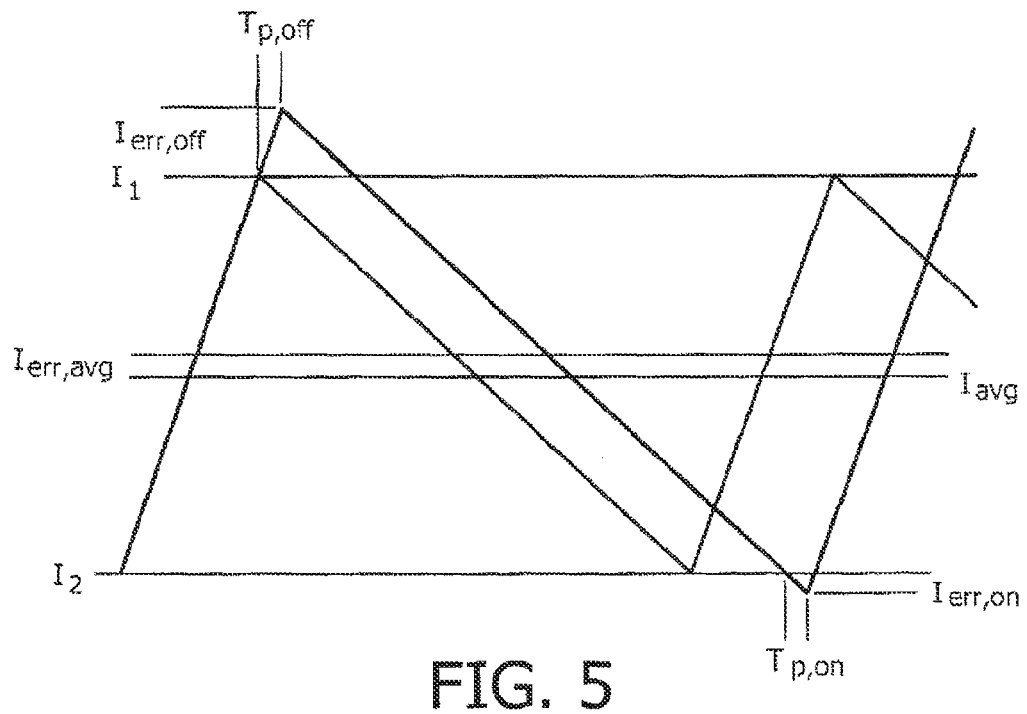
FIG. 5 depicts a timing diagram of an output current of the hysteretic converter of FIG. 4.

In practice, the circuit components of the hysteretic converter stage 122, in particular the control circuit 410 thereof, have a propagation delay which results in a shoot-through of the hysteretic converter stage output current, as illustrated in FIG. 5.

In FIG. 5, a first (idealized) current level $I_1$ indicates a maximum output current when switching the third switch 402 from a conducting state into a non-conducting state when propagation delays would be absent. A second (idealized) current level $I_2$ indicates a minimum output current when switching the third switch 402 from a non-conducting state into a conducting state when propagation delays would be absent. When switching the third switch 402 from a non-conducting state to a conducting state, the output current ramps up from $I_2$ to $I_1$ as substantially determined by the third inductor 406. When switching the third switch 402 from a conducting state to a non-conducting state, the output current ramps down from $I_1$ to $I_2$. Thus, an average output current $I_{avg}$ is generated. For illustration only, $I_1$ may be up to 20% higher, and $I_2$ may be up to 20% lower, than $I_{avg}$.

Effects of shoot-through of the hysteretic converter stage output current are indicated by a propagation delay time $T_{p,off}$ when switching the third switch 402 from a conducting state to a non-conducting state, and by a propagation delay time $T_{p,on}$ when switching the third switch 402 from a non-conducting state to a conducting state, respectively. As illustrated in FIG. 5, the delay time $T_{p,off}$ results in a current error overshoot $I_{err,off}$, while the delay time $T_{p,on}$ results in a current error undershoot $I_{err,on}$, thereby producing an average output current error $I_{err,avg}$.

The amount of shoot-through is partly determined by the hysteretic converter stage input voltage. This is compensated by resistor 436, which is used for a feed forward of the input voltage to the comparator 418. The resistor 430 is used for a feed forward of the voltage at the output terminal 104 to the reference voltage level of the comparator 418, to make the output current substantially independent from the voltage at the output terminal 104.

Thus, the hysteretic converter stage 122 provides a stable output current $I_{avg}$ even in case of input voltage fluctuations as may be the case when using the LLC converter stage 116 without a feedback control. Accordingly, with relatively simple converter stages (an LLC converter stage 116 without feedback control, coupled to a hysteretic converter stage 122) comprising relatively few components, a power supply circuit can be assembled providing a stable output current. This is ideally suited for driving e.g. an LED load or a (color-) channel thereof. In practice, a plurality of hysteretic converter stages 122 coupled in parallel to an LLC converter stage 116 may drive different LED color channels.

For dimming of e.g. an LED load, each hysteretic converter stage may be switched on and off in pulse width modulation, PWM, operation.

According to the preceding description, a power supply circuit has an LLC converter stage for converting a DC voltage input into a DC voltage output, and at least one hysteretic converter stage. Each hysteretic converter stage has a DC voltage input coupled to the DC voltage output of the LLC converter stage, and a DC current output. The LLC converter stage lacks a feedback control, and is operated at its load independent point. A ripple on the DC voltage output of the LLC converter does not affect the output current of the hysteretic converter stage. The stable DC current output of the hysteretic converter stage is coupled to a load having one or more LED strings.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

A single processor or other unit may fulfill the functions of several items recited in the claims.

The invention claimed is:

1. A power supply circuit for supplying a stable DC current output, the power supply circuit comprising:
   an LLC converter stage for converting a DC voltage input into a DC voltage output; and
   at least one hysteretic converter stage having a DC voltage input coupled to the DC voltage output of the LLC converter stage, and having a DC current output,
   wherein the LLC converter stage lacks a feedback control.

2. The power supply circuit of claim 1, wherein the LLC converter stage is configured to operate at a predetermined frequency.

3. The power supply circuit of claim 2, wherein the LLC converter stage is configured to operate at a load independent point of the predetermined frequency.

4. The power supply circuit of claim 1, wherein voltage at the DC current output of the hysteretic converter stage is lower than voltage at the DC voltage input of the hysteretic converter stage.

5. The power supply circuit of claim 4, wherein the hysteretic converter stage comprises a buck converter.

6. The power supply circuit of claim 1, further comprising:
a mains converter stage for converting an AC mains voltage into a DC voltage output, wherein the DC voltage input of the LLC converter stage is coupled to the DC voltage output of the mains converter stage.

7. A lighting arrangement comprising:
the power supply circuit of claim 1; and
a LED lighting module, wherein the DC current output of the at least one hysteretic converter stage is coupled to the LED lighting module.

8. A method of supplying a stable DC current to at least one load, the method comprising:
converting a DC voltage input into a DC voltage output by an LLC converter stage operated at a predetermined frequency;
converting the DC voltage output of the LLC converter stage into at least one DC current output by at least one hysteretic converter stage; and
supplying the at least one DC current output to the at least one load.

9. The method of claim 8, wherein the LLC converter stage is operated at a load independent point thereof.

10. A power supply circuit for supplying a stable DC current output, the power supply circuit comprising:
an LLC converter stage for converting DC input voltage into a DC output voltage, the LLC converter stage comprising:
input terminals configured to receive the DC input voltage;
output terminals configured to output the DC output voltage;
a first switch and a second switch connected in series between the input terminals;
a series arrangement of at least one inductor and a capacitor connected in parallel with one of the first switch and the second switch; and
a control circuit configured to control a switching frequency of the first and second switches to operate at a predetermined frequency; and
a hysteretic converter stage having input terminals coupled to the output terminals of the LLC converter to receive the DC output voltage, and having output terminals to output a DC output current to a corresponding load.

11. The power supply circuit of claim 10, wherein the control circuit does not provide feedback control to the LLC converter stage.

12. The power supply circuit of claim 10, wherein the at least one inductor comprises a first inductor and a second inductor connected in series between the one of the first and second switches and the capacitor.

13. The power supply circuit of claim 12, wherein the second inductor is a transformer.

14. The power supply circuit of claim 13, wherein the LLC converter stage further comprises:
a rectifier circuit coupled to the second inductor and configured to isolate and filter the DC output voltage output at the output terminals.

* * * * *